Patented Nov. 25, 1947

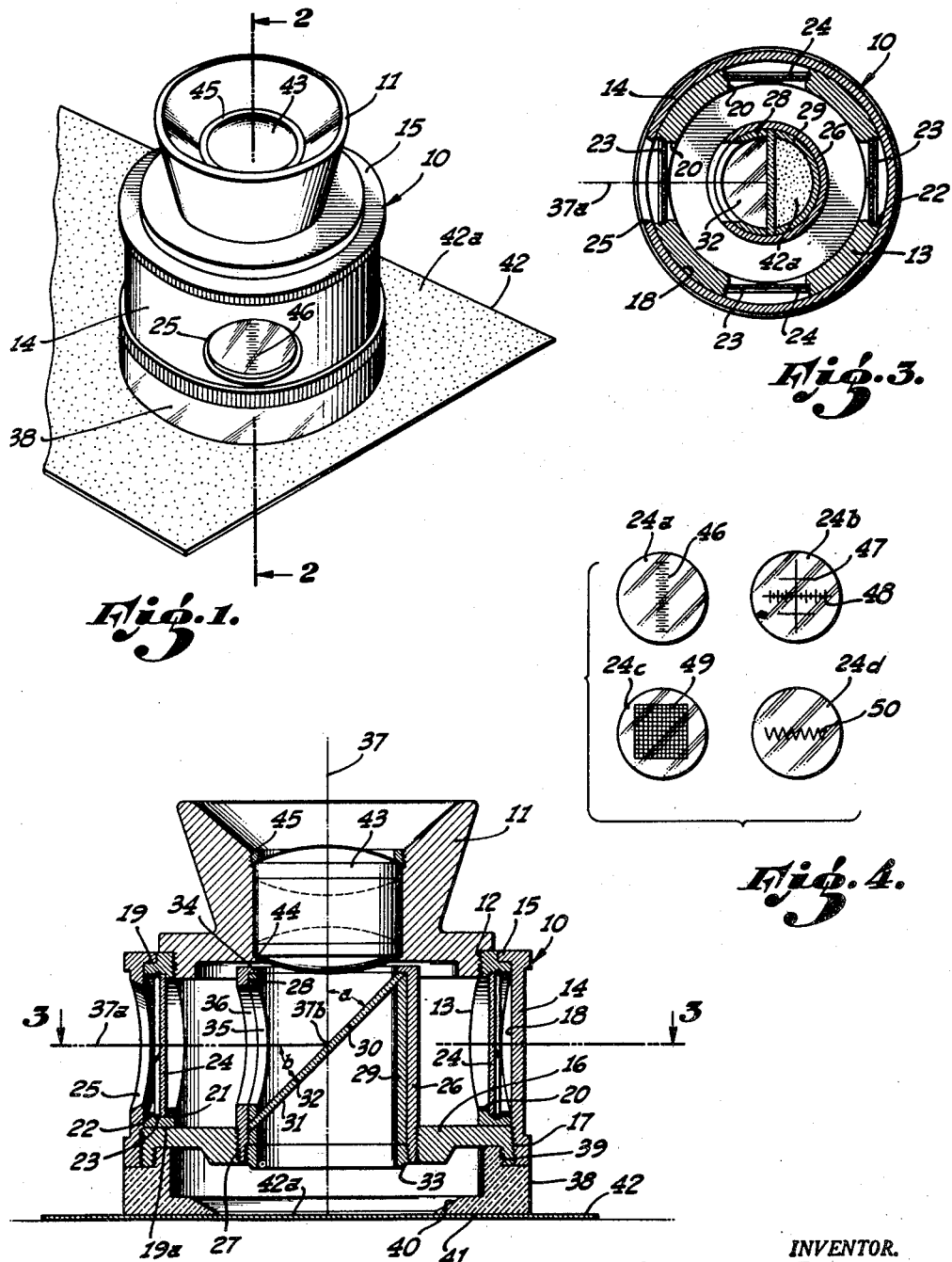

2,431,666

UNITED STATES PATENT OFFICE 2,431,666

MULTIPLE GRATICULE MAGNIFIER WITH TRANSPARENT REFLECTOR

Gustave Fassin, Arcadia, Calif., assignor, by mesne assignments, to Lane-Wells Company, Los Angeles, Calif., a corporation of Delaware Application March 13, 1945, Serial No. 582,517

8 Claims. (Cl. 88—2.3)

This invention relates to optical instruments and more particularly to optical inspection devices for visually determining the normally invisible, dimensional characteristics or quality of the surface or superficial structure of a material or object.

For example, the visual inspection of fabrics to ascertain their various physical characteristics such as the number of threads per inch in the weave has heretofore been performed by placing a transparent, graduated scale or grating in contact with the surface of the fabric and viewing both through a suitable magnifying lens. By this means the number of threads per unit length of scale were visually counted and the corresponding number of threads per inch computed. This method required that the scale markings be placed in direct contact with the surface of the material being inspected in order to avoid parallax errors and such usage resulted in wear and damage to the delicate and necessarily finely engraved scale required for this purpose which soon rendered it illegible. Furthermore, where the material being thus inspected was substantially opaque, a scale thus superimposed upon it was difficult to see by reason of a lack of sufficient illumination.

Where the material to be inspected comprises an abrasive grit such as pulverized carborundum, emery, glass or the like material, for ascertaining the dimensions of the abrasive particles or the number of such particles per unit area in a given deposited layer, such as for example; on the surface of emery cloth or sand paper, it is obviously impractical to utilize a device in which the delicate scale must be placed in direct contact with the material. Moreover, where the required magnification is high with accompanying low depth of focus and the surface under inspection is deeply irregular, it is often impossible to place both the superimposed scale and the body of the surface irregularities simultaneously in satisfactory focus.

Numerous other obvious disadvantages are inherent in the beforementioned type of inspection devices heretofore employed.

It is accordingly an object of this invention to provide an optical instrument of the beforementioned type in which the numerous disadvantages inherent in those heretofore employed are eliminated.

It is another object of this invention to provide a visual inspection instrument in which the various scales or patterns to be visually superimposed upon the material surface for comparative inspection thereof, are maintained out of contact with the material.

It is a further object of this invention to provide an inspection instrument in which parallax errors are practically eliminated regardless of the characteristics or degree of irregularity of this surface of the material under inspection.

It is a still further object to provide an inspection instrument in which the comparative scale or pattern may be adequately illuminated and clearly visible regardless of the contrasting color, opacity or pattern of the material to be viewed.

It is a still further object of the invention to provide a self contained optical inspection unit incorporating a number of comparative scales, diagrams, patterns and the like which may be selected and quickly placed in visual superimposition upon a surface to be viewed.

With the foregoing objects in view, this invention resides broadly in an optical system through which the surface portion of a substance, object or body may be viewed, usually under substantial magnification and optical means to effect the apparent but non-physical superimposition of a suitable graticule or reticule pattern or scale upon the exact object plane of the system in which the beforementioned surface is viewed.

These and other objects, advantages and features of novelty will be evident hereinafter.

In the drawings which show by way of illustration a preferred embodiment of the invention and in which like numerals designate the same or similar parts throughout the several views:

Figure 1 is a pictorial view of the instrument of this invention showing it in an operative position upon a material surface to be inspected.

Figure 2 is a sectional elevation of the instrument, taken on the line 2—2 of Figure 1.

Figure 3 is a cross-sectional view taken on line 3—3 of Figure 2, and

Figure 4 includes a view of a number of typical graticule disc designs suitable for the instrument.

Referring now, primarily to Figures 2 and 3 of the drawings, the lens mounting or body structure of the instrument is indicated generally at 10 of which 11 is a suitable eye-piece or eye-cap, making threaded connection at 12 with the end of an annular, sleeve-shaped, graticule retainer 13 which in turn is retained and makes a rotatable fit within a cylindrical housing member 14. The rotatable graticule retainer is positioned concentrically within the said housing member 14 and retained against longitudinal displacement between an upper inwardly extending shoulder 15 and a lower annular diaphragm member 16. The diaphragm 16 is threadedly connected at 17 to the lower end portion of the beforementioned housing 14.

The eyecap 11 and the annular graticule retainer 13 are thus coaxially rotatable together as a unit within the housing 14 and when so rotated the necessary relative sliding motion between the graticule retainer and the housing occurs at 18 along the adjacent cylindrical surfaces thereof and at the end bearing surfaces 19 and 19a located respectively at the beforementioned shoulder 15 and annular diaphragm 16.

In the eyecap 11, a suitable magnifying lens or lens system 43, having an optical axis coincident with the instrument axis 37 is retained in place upon shoulder 44 by means of a suitable, threaded retaining ring 45. The magnification of the lens 43 may be of any suitable value, depending upon the materials to be inspected, but, for general purposes, such as the inspection of fine fabrics, the lens 43 may have a magnification of the order of 5 to 10.

The eyecap 11 and associated end closure flange portion may be of any suitable opaque material. Hard rubber or a thermo setting plastic material are well suited for this element of the instrument.

The annular or sleeve-shaped graticule retainer 13 is provided with a plurality of radially directed, circumferentially spaced, circular openings as shown at 20 in Figures 2 and 3, which openings constitute the mountings for the plurality of graticules hereinafter more fully described. Each such opening 20 in the graticule retainer annulus is provided with an inner shoulder 21 and a counter-bored ring groove 22 adapted to retain a split retainer ring 23 for the purpose of retaining between said shoulder 21 and said retainer ring 23 a relatively thin graticule disc in the manner shown at 24. While, for the purpose of convenience in illustration, four graticule openings are shown in the graticule retaining annulus 13 the number need not be so limited, but may be any convenient number depending upon the size, type, and number of the particular graticules required or desired to be employed in connection with the particular field of inspection for which the instrument is to be used.

The housing member 14 which surrounds and encloses the beforementioned graticule retainer annulus 13 is provided with a single circular aperture 25 as best shown in Figures 1 and 2, such aperture 25 being of substantially the same size or diameter as any one of the graticule mountings and so located axially or longitudinally with respect to the instrument and the rotatable graticule retainer annulus as to permit by relative rotation between the housing member 14 and the graticule retainer annulus 13 the exposure of any one of the plurality of mounted graticules to an external, artificial or natural source of illumination. The housing member 14 may be made of any suitable metal or opaque material which will otherwise exclude light from the interior of the instrument.

Centrally and coaxially located within the housing member 14 and the graticule retainer annulus 13 is a tubular shaped reflector housing 26 threadedly joined and supported at 27 in the central opening of the diaphragm 16. Within the reflector supporting tube 26 and making a snug sliding fit therein are a pair of tubular sleeve spacers 28 and 29 having adjacent, diagonally cut end surfaces 30 and 31 between which an elliptically shaped, partially transparent reflecting member 32 is retained and clamped. Clamping force for the reflector 32 is applied axially to the sleeve members 28 and 29 by means of a threaded retainer ring 33 at the lower end acting against an inwardly extending shoulder 34 at the top of the tube 26. Both the upper sleeve 28 and the tube 26 are provided with adjoining, coaxial, circular apertures 35 and 36, respectively, the common axis 37a of which centrally intersects the plane of the upper reflecting surface of the reflector 32 at the point of intersection of the coincident axes 37 of the instrument and the optical system as best shown at 37b in Figure 2. While as here illustrated in the preferred construction the axes 37 and 37a intersect at right angles at the center 37b of the upper surface 30 of the reflector 32, other angles of intersection may be employed so long as the angular position of the reflector 32 is such that the angle of incidence shown at $a$ is equal to the angle of reflection shown at $b$. The body member 14 and the central tubular support member 26 are preferably inter-connected through the annular diaphragm 16 to form a unit in which the before described circular openings 35 and 36 are fixed in coaxial relation with the beforementioned apertures 25 and this axis shown at 37a which is common to the openings 35 and 36 and aperture 25 is in the preferred construction shown radially directed, although it may be otherwise as before mentioned. However, when the axis 37a is other than radial, it is obviously necessary to modify the reticule mountings to provide for their being positioned with their planes perpendicular to the said axis.

An annular shaped base member 38 is threaded at 39 to the inner, lower end portion of the annular diaphragm 16 which constitutes a portion of the before described magnifier lens mounting. The base member 38 is provided with a relatively large central opening 40 through which material to be inspected may be viewed as hereinafter more fully described and with an annular end surface 41 which lies in a plane which is substantially coincident with or lies within the range of object plane positions of the lens systems as viewed with average eyes, preferably when accommodated for an object at infinity.

Referring now to Figures 1 and 2, the base member 38 is shown resting in place upon a piece of sheet material 42, the upper surface 42a of which it is desired to view through the magnifier. The upper surface of the sheet material 42a, when thus placed in contact with the bottom end surface 41 of the base member 38, is in coincidence with a suitable object plane of the lens system. The base member 38 is preferably composed or constructed of a light-transmitting material, preferably a translucent material, such as Lucite, Plexiglas, cellulose acetate, or the like plastic materials, whereby sufficient light may be admitted from an external source and fall upon the surface of the material thus being viewed.

In the apparatus constructed in the manner illustrated in the drawing, the graticule retaining annulus 13 is of such a diameter that the graticule illustrated at 24 therein, is supported at a distance, such that it is optically at the same distance from the lens as the object plane which is coincident with the base surface 41. In other words, the graticules are positioned in the graticule retainer 13 radially at a distance, such that they lie in the object plane of the lens system on the line of sight laterally reflected from the surface of the diagonal reflector 32.

The diagonal reflector 32 may be constructed of a relatively thin plate of glass, either unsilvered or carrying an extremely thin film of silver, aluminum or other reflecting metal on the upper surface, as viewed in Figure 2, such that the reflector 32 will be both partially reflecting and transparent.

Referring now primarily to Figure 4, four typical, alternative graticule patterns 24a, 24b, 24c, and 24d, are there illustrated. Graticules or reticules, suitable for the present purpose, may be made of thin glass or film base, upon which a suitable pattern is accurately placed by any suitable means, such as by engraving, or photographic methods. The graticules may be either generally opaque or transparent, depending upon the color and shade of the material to be viewed. In the opaque type of graticule, the entire surface is rendered opaque except for the scale or pattern, which is transparent or translucent. The transparent graticules are generally transparent or translucent over the entire surface thereof with the scale or pattern formed thereon by means of opaque lines or graduations. In Figure 4, 24a illustrates a graticule which may be either of the transparent or opaque graduation type, upon which a scale 46 is shown by way of illustration. The scale 46 shown on the graticule 24a is, for the purpose of convenience in illustration, shown considerably coarser or larger than that which would usually actually be employed in the instrument in connection with the inspection of materials having extremely fine texture; actually the graduation 46 may indicate dimensions in the order of a tenth of a millimeter and a whole scale may be in the order of one to five millimeters in length.

The graticule illustrated at 24b is similar to that illustrated in 24a except that two scales, 47 and 48, positioned at right angles to one another, and having different graduation spacing, is there illustrated. The graticule illustrated at 24c shows a rectangular grating system 49 formed by a plurality of closely spaced intersecting lines. Such a graticule is useful for inspecting fabrics to determine the number of threads per inch, or in other applications, such as the determination by visual inspection of the number of particles or grains of abrasive materials present in deposited form upon a surface upon which they are resting or to which they are bonded. The graticule illustrated at 24d shows a pattern 50 which may have the form of a screw-thread profile which it is desired to inspect through the instrument magnifier for the determination of its accuracy of form or pitch. While only four types of graticule patterns are herein illustrated, it is obvious that innumerable other patterns may be employed suitable to the manifold inspection applications to which the present invention is applicable.

The operation of the apparatus of this invention is as follows: Let it be assumed, for example, that it is desired to determine the size and the number of bonded abrasive carborundum particles per square inch of a given emery paper or cloth. Assuming the sheet member 42 to be the emery paper or cloth, the surface 41 of the base member of the instrument is placed upon and in firm contact with the surface of the sheet 42 to be inspected, in the manner shown in Figures 1 and 2. The upper surface portion 42a of the sheet 42 is then in viewing position in the object plane of the lens 43. The sheet 42 and the instrument are placed in a position to receive light from a natural or artificial source such that both the translucent base member 38 and the aperture 25 in the housing member 14 receive illumination. The upper surface of the sheet 42a, probably being opaque, would not otherwise be illuminated, but sufficient light is transmitted through the translucent member 38 to illuminate that portion of the upper surface of the material 42 to be inspected. At the same time, a suitable graticule is selected and rotated into position registering with the aperture 25 by effecting relative rotation between the capped member 11 and the housing member 14, and such suitable graticule may be one, for example, of the type illustrated at 24c in Figure 4, and may be of the type having a generally opaque surface with the pattern formed by transparent lines. The illuminated image of the graticule 24c, subject to the illumination entering the aperture 25, will be reflected from the upper surface of the reflector 32 through the lens system 43 to the eye of the observer and the image thus formed will appear to be and give the operator the impression that it is directly in contact with the upper surface 42a of the material 42 under examination. The number of abrasive grains present in each rectangle formed by the image of the grating 49 may then be readily counted and from such data the total average number of abrasive grains present in a square inch of abrasive material surface may then be readily computed.

When it is desired to choose other types of graticules, suitable for various other kinds of inspections and examinations, it is only necessary to rotate the graticule retaining member 13 relative to the housing member 14 and reflector 32 to bring any one of the other graticules into registration with the aperture 25.

As heretofore stated, the graticules may be of two main types: one with the field generally opaque and having a transparent pattern; and the other with the field generally transparent with an opaque pattern. It is generally desirable and most satisfactory to employ the former type of graticule when viewing a black and opaque material; whereas, it is more desirable and satisfactory to employ the latter type of graticule when inspecting a transparent, translucent, or light-colored surface material.

As hereinbefore mentioned, one of the important advantages of this invention resides in the ready adaptability of the instrument to the inspection of materials having a wide range of color and translucency. When examining dark or black objects which are virtually opaque, a contrasting luminous scale can be projected into and superimposed upon the field of view of the specimen, while, on the other hand, when light-colored objects, either transparent, translucent, or opaque are examined, an opaque or dark-lined scale can be similarly projected into the field.

While this invention has been, for convenience of illustration, described in connection with a viewing magnifier, its application is not limited to such use, but can be similarly applied to telescopes, compound magnifiers, and the like optical instruments.

When employed in connection with telescopes or microscopes, for example, the lens system serves as an eye piece or an ocular for viewing an image formed by the objective. The object plane in such case would be virtually coincident with or lie in a position comparable to that of the before-mentioned object plane at the end surface 41 of the base member 28, although the associated mechanical structure would then obviously be suitably modified. In the case where the lens system 43 is focused on an image plane as in a telescope or microscope, other modifications of the structure of the instrument are possible. For example, the diagonal reflector 32 may, in such case, be located, not only between the lens system and the object plane as shown, but may be also located beyond the object plane and the image of the graticule, reflected thereby to the object plane of the eye piece lens system. An auxiliary lens would be required in the latter case, associated with the graticule to form the graticule image at the object plane of the said eye piece or ocular.

It is to be understood that the terms, lens magnifier and magnifier lens, are employed herein and throughout the claims to include any suitable lens either single or compound, and either serving as an ocular or a magnifier of any suitable magnifying power.

It is to be understood that the foregoing is illustrative of but one apparatus and that the invention is not limited thereby, but may include various modifications and changes made by those skilled in the art without departing from the spirit and scope of the invention as defined in the appended claims.

I claim:

1. An optical instrument comprising: a light excluding cylindrical mounting; a magnifier lens positioned adjacent and closing one end of said mounting and having its optical axis coaxial therewith; a translucent, annular base member attached coaxially to the opposite end portion of said mounting and having an outer end surface lying in a plane substantially coincident with the object plane of said magnifier lens; a transparent, partial reflector in said mounting and diagonally positioned with its plane reflecting surface intersected by and making an angle of 45° with the said optical axis whereby the line of sight of said magnifier lens is split at said reflector to form a radially directed branch path having a laterally located object plane lying parallel with the said optical and mounting axes; an annular graticule retainer axially positioned with respect to said mounting to intercept said lateral branch path adjacent its said object plane; a plurality of circumferentially spaced, radially directed graticule mountings in said retainer, said retainer being concentrically associated with said cylindrical mounting in a manner permitting relative rotation between said retainer and said reflector about said axes and the selective positioning thereby of any one of said graticule mountings substantially in said laterally located object plane, and means associated with said light excluding mounting and said retainer to admit light to only the graticule mounting so positioned substantially in said laterally located object plane.

2. An optical instrument comprising: a light excluding cylindrical mounting; a magnifier lens and associated eye piece positioned adjacent and closing one end of said mounting and having its optical axis coaxial therewith, said lens and eye piece being rotatable with respect to said mounting; a translucent, annular base member attached coaxially to the opposite end portion of said mounting and having an outer end surface lying in a plane substantially coincident with an object plane of said magnifier lens; a transparent, partial reflector fixed in said mounting and diagonally positioned with its plane reflecting surface intersected by and making an angle of 45° with the said optical axis whereby the line of sight is split at said reflector to form a radially directed branch path having a laterally located object plane lying parallel with the said optical and mounting axes; an annular graticule retainer fixed to said eye piece and axially positioned with respect to said mounting to intercept said lateral branch path adjacent its said object plane; a plurality of circumferentially spaced, radially directed graticule mountings in said retainer, said retainer being concentrically rotatable within said cylindrical mounting in a manner permitting relative rotation between said retainer and said reflector about said axes and the selective positioning thereby of any one of said graticule mountings substantially in said laterally located object plane, and an aperture located in said light excluding mounting to admit light to only the graticule mounting so positioned substantially in said laterally located object plane.

3. An optical instrument comprising: a light excluding cylindrical mounting; a magnifier lens positioned adjacent and closing one end of said mounting and having its optical axis coaxial therewith; an annular base member providing a relatively narrow, substantially annular, light entrance attached coaxially to the opposite end portion of said mounting and having an outer end surface lying in a plane substantially coincident with the object plane of said magnifier lens; a transparent partial reflector in said mounting and diagonally positioned with its plane reflecting surface intersected by and making an angle of 45° with the said optical axis whereby the line of sight of said magnifier lens is split at said reflector to form a radially directed branch path having a laterally located object plane lying parallel with the said optical and mounting axes; an annular graticule retainer axially positioned with respect to said mounting to intercept said lateral branch path adjacent its said object plane; a plurality of circumferentially spaced, radially directed graticule mountings in said retainer, said retainer being concentrically associated with said cylindrical mounting in a manner permitting relative rotation between said retainer and said reflector about said axes and the selective positioning thereby of any one of said graticule mountings substantially in said laterally located object plane; and means associated with said light excluding mounting and said retainer to admit light to only the graticule mounting so positioned substantially in said laterally located object plane.

4. An optical instrument comprising: a light excluding cylindrical mounting; a magnifier lens positioned adjacent and closing one end of said mounting and having its optical axis coaxial therewith; a base member providing a relatively narrow substantially annular light entrance, said light entrance annulus being coaxial with and positioned at the opposite end portion of said mounting, said base member terminating in an outer end lying in a plane substantially coincident with the object plane of said magnifier lens; a transparent, partial reflector in said mounting and diagonally positioned with its plane reflecting surface intersected by and making an angle of 45° with the said optical axis whereby the line of sight of said magnifier lens is split at said reflector to form a radially directed branch path having a laterally located object plane lying parallel with the said optical and mounting axes; an annular graticule retainer axially positioned with respect to said mounting to intercept said lateral branch path adjacent its said object plane;

a plurality of circumferentially spaced, radially directed graticule mountings in said retainer, said retainer being concentrically associated with said cylindrical mounting in a manner permitting relative rotation between said retainer and said reflector about said axes and the selective positioning thereby of any one of said graticule mountings substantially in said laterally located object plane; and means associated with said light excluding mounting and said retainer to admit light to only the graticule mounting so positioned substantially in said laterally located object plane.

5. An optical instrument comprising: a light excluding cylindrical mounting; a magnifier lens positioned adjacent and closing one end of said mounting and having its optical axis coaxial therewith; a base member providing a relatively narrow substantially annular light entrance, said light entrance annulus being coaxial with and positioned at the opposite end portion of said mounting, said base member terminating in an outer end lying in a plane substantially coincident with the object plane of said magnifier lens; a transparent, partial reflector in an intermediate portion of said mounting and diagonally positioned with its plane reflecting surface intersected by and making an angle with said optical axis whereby the line of sight of said magnifier lens is split at said reflector to form a laterally directed branch path having a laterally located object plane; an annular graticule retainer axially positioned with respect to said mounting to intercept said lateral branch path adjacent its said object plane; a plurality of circumferentially spaced graticule mountings in said retainer, said retainer being concentrically associated with said cylindrical mounting in a manner permitting relative rotation between said retainer and said reflector about said axes and the selective positioning thereby of any one of said graticule mountings substantially in said laterally located object plane; and means associated with said light-excluding mounting and said retainer to admit light to only the graticule mounting so positioned substantially in said laterally located object plane.

6. An optical instrument comprising: a light excluding cylindrical mounting; a magnifier lens and associated eye piece positioned adjacent and closing one end of said mounting and having its optical axis coaxial therewith, said lens and eye piece being rotatable with respect to said mounting; an annular base member providing a relatively narrow substantially annular, light entrance attached coaxially to the opposite end portion of said mounting and having an outer end surface lying in a plane substantially coincident with an object plane of said magnifier lens; a transparent partial reflector fixed in said mounting and diagonally positioned with its plane reflecting surface intersected by and making an angle of 45° with the said optical axis whereby the line of sight is split at said reflector to form a radially directed branch path having a laterally located object plane lying parallel with the said optical and mounting axes; an annular graticule retainer fixed to said eye piece and axially positioned with respect to said mounting to intercept said lateral branch path adjacent its said object plane; a plurality of circumferentially spaced, radially directed graticule mountings in said retainer, said retainer being concentrically rotatable within said cylindrical mounting in a manner permitting relative rotation between said retainer and said reflector about said axes and the selective positioning thereby of any one of said graticule mountings substantially in said laterally located object plane; and an aperture located in said light-excluding mounting to admit light to only the graticule mounting so positioned substantially in said laterally located object plane.

7. An optical instrument comprising: a light excluding cylindrical mounting; a magnifier lens and associated eye piece positioned adjacent and closing one end of said mounting and having its optical axis coaxial therewith, said lens and eye piece being rotatable with respect to said mounting; a base member providing a relatively narrow substantially annular light entrance, said light entrance annulus being coaxial with and positioned at the opposite end portion of said mounting, said base member terminating in an outer end lying in a plane substantially coincident with an object plane of said magnifier lens; a transparent, partial reflector fixed in said mounting and diagonally positioned with its plane reflecting surface intersected by and making an angle of 45° with the said optical axis whereby the line of sight is split at said reflector to form a radially directed branch path having a laterally located object plane lying parallel with the said optical and mounting axes; an annular graticule retainer fixed to said eye piece and axially positioned with respect to said mounting to intercept said lateral branch path adjacent its said object plane; a plurality of circumferentially spaced, radially directed graticule mountings in said retainer, said retainer being concentrically rotatable within said cylindrical mounting in a manner permitting relative rotation between said retainer and said reflector about said axes and the selective positioning thereby of any one of said graticule mountings substantially in said laterally located object plane; and an aperture located in said light-excluding mounting to admit light to only the graticule mounting so positioned substantially in said laterally located object plane.

8. An optical instrument comprising: a light excluding cylindrical mounting; a magnifier lens and associated eye piece positioned adjacent and closing one end of said mounting and having its optical axis coaxial therewith, said lens and eye piece being rotatable with respect to said mounting; a base member providing a relatively narrow, substantially annular light entrance, said light entrance annulus being coaxial with and positioned at the opposite end portion of said mounting said base member terminating in an outer end lying in a plane substantially coincident with an object plane of said magnifier lens; a transparent, partial reflector fixed in an intermediate portion of said mounting and diagonally positioned with its plane reflecting surface intersected by and making an angle with said optical axis whereby the line of sight is split at said reflector to form a laterally directed branch path having a laterally located object plane; an annular graticule retainer fixed to said eye piece and axially positioned with respect to said mounting to intercept said lateral branch path adjacent its said object plane; a plurality of circumferentially spaced, laterally directed graticule mountings in said retainer, said retainer being concentrically rotatable within said cylindrical mounting in a manner permitting relative rotation between said retainer and said reflector about said axes and the selective positioning thereby of any one of said graticule mountings substantially in said laterally located object plane; and an aperture located in said light excluding mounting to admit light to only the graticule mountings so positioned substantially in said laterally located object plane.

GUSTAVE FASSIN.

REFERENCES CITED

The following references are of record in the file of this patent:

UNITED STATES PATENTS

| Number | Name | Date |
|---|---|---|
| 2,241,691 | Williams | May 13, 1941 |
| 1,913,793 | Clementi et al. | June 13, 1933 |
| 886,647 | Schleth | May 5, 1908 |
| 1,549,518 | Steinle | Aug. 11, 1925 |
| 1,420,096 | Hague | June 20, 1922 |
| 2,241,693 | Williams | May 13, 1941 |
| 2,096,669 | Burgard | Oct. 19, 1937 |

FOREIGN PATENTS

| Number | Country | Date |
|---|---|---|
| 15,708 | Great Britain | 1915 |